(12) United States Patent
Martín Hernández

(10) Patent No.: US 7,815,147 B2
(45) Date of Patent: *Oct. 19, 2010

(54) REINFORCED COVER FOR CUT-OUTS IN AN AERODYNAMIC CONTOUR

(75) Inventor: Agustin Mariano Martín Hernández, Madrid (ES)

(73) Assignee: Airbus Operations, S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 11/888,618

(22) Filed: Aug. 1, 2007

(65) Prior Publication Data

US 2008/0029647 A1 Feb. 7, 2008

Related U.S. Application Data

(63) Continuation of application No. 11/323,146, filed on Dec. 30, 2005, now abandoned.

(30) Foreign Application Priority Data

Dec. 31, 2004 (ES) ............... P 200403162

(51) Int. Cl.
*B64C 1/38* (2006.01)
*B64C 3/58* (2006.01)

(52) U.S. Cl. ...................... 244/130; 244/213

(58) Field of Classification Search ............ 244/130, 244/131, 211–217; 296/178, 180.1
See application file for complete search history.

(56) References Cited

U.S. PATENT DOCUMENTS

| 1,659,771 | A | * | 2/1928 | Fox ........................... 418/190 |
| 2,166,292 | A | * | 7/1939 | Hall .......................... 244/212 |
| 2,334,975 | A | * | 11/1943 | Williams .................... 244/216 |
| 2,407,401 | A | * | 9/1946 | Clauser et al. .............. 244/216 |
| 2,654,685 | A | * | 10/1953 | Voelker ....................... 52/208 |
| 2,915,948 | A | * | 12/1959 | Fehring ..................... 89/37.16 |
| 2,950,083 | A | * | 8/1960 | Compton et al. ............ 416/230 |
| 3,054,484 | A | * | 9/1962 | Griffiths et al. ............. 403/317 |
| 3,184,186 | A | * | 5/1965 | Minoru et al. .............. 244/213 |
| 3,292,330 | A | * | 12/1966 | Tennison ................. 52/396.09 |
| 3,349,157 | A | * | 10/1967 | Parsons ...................... 264/255 |
| 3,420,570 | A | * | 1/1969 | Kunz ..................... 296/100.06 |
| 3,478,988 | A | * | 11/1969 | Roed Age Eilef ........... 244/211 |

(Continued)

FOREIGN PATENT DOCUMENTS

GB 2 323 576 A 3/1997

*Primary Examiner*—Tien Dinh
*Assistant Examiner*—Joseph W Sanderson
(74) *Attorney, Agent, or Firm*—Klauber & Jackson LLC

(57) ABSTRACT

Reinforced cover for cut-outs in an aerodynamic contour of a vehicle, with a first attachment section 1a attachable to a structural element (2,5) of the vehicle (11); a second elastic section 1c which covers the cut-out (4) which is located between a fixed part 5 and a moving part (6, 12) of the vehicle (11), and provided with a low-friction layer (8) on its inner surface (1e), which comprises a first area (1i) in a rectangular configuration and a second area (1j) with a second cross-section smaller than that of the first area (1i); an outer surface (1k) with a fiberglass layer (7a); a main internal body (9) of a flexible material, a transition section (1g) thickened between the first and the second section, (1a, 1c); flushing the outer surface (1k) of the second section (1c) with the outer surface (5a).

24 Claims, 7 Drawing Sheets

U.S. PATENT DOCUMENTS

| | | | |
|---|---|---|---|
| 3,897,970 A * | 8/1975 | Gattenby | 296/166 |
| 4,120,470 A * | 10/1978 | Whitener | 244/213 |
| 4,131,252 A * | 12/1978 | Dean et al. | 244/212 |
| 4,212,440 A * | 7/1980 | Ferris | 244/1 R |
| 4,213,587 A * | 7/1980 | Roeseler et al. | 244/213 |
| 4,344,995 A * | 8/1982 | Hammer | 428/61 |
| 4,784,355 A * | 11/1988 | Brine | 244/213 |
| 4,995,575 A * | 2/1991 | Stephenson | 244/216 |
| 5,031,836 A * | 7/1991 | Ward | 239/265.19 |
| 5,065,960 A * | 11/1991 | Castellucci | 244/131 |
| 5,106,037 A * | 4/1992 | Sherrill | 244/132 |
| 5,222,692 A * | 6/1993 | Glowacki | 244/53 R |
| 5,372,336 A * | 12/1994 | Paez | 244/49 |
| 5,516,185 A * | 5/1996 | O'Donnell et al. | 296/166 |
| 5,622,336 A * | 4/1997 | Chavanne et al. | 244/129.1 |
| 5,695,154 A * | 12/1997 | Castellucci et al. | 244/130 |
| 5,735,485 A * | 4/1998 | Ciprian et al. | 244/113 |
| 6,447,050 B1 * | 9/2002 | Plassmeyer et al. | 296/180.5 |
| 6,485,093 B2 * | 11/2002 | Reivers | 296/217 |
| 6,729,583 B2 * | 5/2004 | Milliere | 244/213 |
| 6,877,695 B2 * | 4/2005 | Eveker et al. | 244/129.5 |
| 6,981,676 B2 * | 1/2006 | Milliere | 244/213 |
| 7,118,070 B2 * | 10/2006 | Abrams et al. | 244/129.3 |
| 2005/0230565 A1 * | 10/2005 | Kallinen | 244/217 |
| 2005/0242243 A1 * | 11/2005 | Seve | 244/213 |
| 2006/0006286 A1 * | 1/2006 | Eveker et al. | 244/129.5 |

* cited by examiner

REINFORCED COVER FOR CUT-OUTS IN AN AERODYNAMIC CONTOUR

RELATED APPLICATION

The present application is a Continuation application of Ser. No. 11/323,146, filed on Dec. 30, 2005 now abandoned, which in turn claims priority from Spanish Application Serial No. 200403162, filed on Dec. 31, 2004. Applicants claim priority under 35 U.S.C. §119 as to said applications, the entire disclosure of which is incorporated herein by reference in its entirety.

TECHNICAL FIELD OF THE INVENTION

The present invention pertains to the field of the covers used for covering recesses, hollows and/or cut-outs which affect the aerodynamic properties of outer surfaces of vehicles such as aircraft and high-speed trains. This invention is particularly encompassed within the sector of the covers used for covering cut-outs located between the surface of a moving element and the surface of a fixed element on such a vehicle.

PRIOR ART TO THE INVENTION

On high-speed vehicles such as aircraft and high-speed trains, there are moving elements articulated to fixed elements, between which there are cut-outs in the aerodynamic contour, located in the areas in which a surface is attached to a primary adjacent structure which negatively affect the aerodynamic contour of the vehicle. The sealing of these cut-outs, which may be large in size, is necessary for the purpose of reducing the structural or parasitic drag of the vehicle and so as not to affect the aerodynamic efficiency of the surface, given that the dimensions of such cut-outs may generate unanticipated behaviors in the flow of air circulating around the vehicle. This problem is especially important for aircraft.

The typical movement of the surfaces of the moving elements is usually that of revolving about a fixed axis. If this axis is located near the surface, the fitting holding it into place may interfere with the outer cladding of the moving surface, being the reasons why cut-outs must be made therein, these cut-outs being dimensioned so as to prevent interference in the case of maximum deflection of the surface. On returning to the cruising position, these cut-outs remain open outward, thus giving rise to aerodynamic problems consisting, on one hand, in the possibility of unanticipated behaviors of the vehicle and, on the other, in larger fuel consumption.

In the case of aircraft and, for example, in elevators, linkage of the elevator to the aircraft frame usually consists of a fixed fitting supported by a primary structure covered by an aerodynamic panel and a fitting of the moving element, joined together by means of an assembly comprising of a bolt and bushings, which serve as a rotation axis of the moving element.

Inside the cavities in the interior of the cut-outs formed between such fixed and moving elements, vortices are usually generated which are responsible for increasing the structural or parasitic drag, so that sealing thereof must be aimed at reducing the existing cut-outs to the maximum. As the internal (non-aerodynamic) elements is exposed, the air current may be deflected, which may give rise to the aforementioned unanticipated behaviors in the airflow. In addition thereto, when there are cut-outs of this type in two parts of the structure distanced from each other and which are connected to each other, a flow of air is generated within the interior of the structure which, at the outlet opening, may cause flow separations, the aerodynamic efficiency being reduced thereby, it therefore being necessary that the sealing of such cut-outs covers the largest possible portion thereof in order to create an effective barrier which will restrain or even stop this flow of air.

To overcome the aerodynamic problems caused by cavities and cut-outs located between moving elements and fixed elements, different types of covers, also known as seals, have been conceived.

A first type of such seals are non-reinforced tongue-shaped seals, covered in low-friction polyester fabric. Although these seals are capable of withstanding major deflections, their lack of reinforcement may lead, under certain conditions, such as, for example at high cruising speeds, to a flapping of the tongue, thus reducing its efficiency and being able to cause a negative effect on the aerodynamics. In addition thereto, in the movements in which the friction against the moving surface tends to contract the seal, blockages may occur, especially if there are deposits of grime.

A second type of seal is a tongue-shaped seal with internal cloth reinforcement, covered with low-friction polyester fabric, which, although it improves the negative aspects of the non-reinforced tongue-shaped seals, has the drawback of the reinforcement provided by the cloth is not sufficient to reduce the aforementioned flapping to desired levels.

A third type of seals is the tongue-shaped seal with integrated plastic or metal reinforcement, covered with low-friction fabric, which, although having a suitable rigidity, needs an auxiliary structure for supporting the seal, so that, although they provide a positive solution to the aerodynamic problems, are of an unacceptable structural weight.

It was therefore desirable to develop a cover which providing an effective sealing of the cavities and cut-outs of the above-mentioned type, which would reduce the structural or parasite drag to the maximum degree and would prevent unanticipated behaviors of the flow, with a controllable rigidity in order to withstand the major deflections without undergoing any flapping, attached to the adjacent structured integrated into the cover, which would protrude only minimally beyond the aerodynamic contour, would be highly resistant against atmospheric agents and would provide a good degree of aesthetic finishing, given that it would have to be visible from the outside.

DESCRIPTION OF THE INVENTION

The present invention has the purpose of overcoming the drawbacks of the prior art stated hereinabove by means of a reinforced cover for cut-outs and hollows in the aerodynamic contour of a vehicle, particularly for an aircraft, which comprises a first attachment section attachable to a structural element of the vehicle by attachment means, a second elastic tongue-shaped section with an extension which covers at least partially an existing cut-out between a fixed part and a moving part of the vehicle and with a free end which ends on the outer surface of the moving part, reinforcement means, and a low sliding friction layer, such as, for example, a layer of polyester fabric, which covers at least partially the inner surface of the second section, a main internal body of a elastic material, such as, for example, silicone rubber, in which cover:

the reinforcement means comprise at least a fiberglass layer formed at the outer surface of the first section, and on at least one area adjacent to the first section of the outer surface of the second section;

the first section extends in a first axial plane, and the second section extends in a second axial plane, the first axial plane being different from the second axial plane;

the area adjacent to the second section comprises a transition section which joins the first section to the second section; and the second section comprises a first area with a first cross section beginning in said adjacent area, and a second area with a second cross section smaller than the cross section of the first area, and which extends towards said free end. The second area may be, for example, rectangular or trapezoidal.

According to the invention, the thickness of the fiberglass layer may be variable in terms of the stresses to which the first and the second sections are exposed.

The areas which require maximum reinforcement are usually the first section and the adjacent section, given that, on one hand, the first section is the area by which the cover is attached, in other words, for attaching the cover to the fixed structural element of the vehicle, whilst the adjacent area which includes the aforementioned transition plane, is the area which includes the bending axis of the second section with regard to the first plane and, therefore, is subjected to continuous bending stress. Therefore, the thickness of the fiberglass layer at the second section preferably decreases in direction towards the free end of the second section and, more preferably, the thickness of the fiberglass layer in the aforementioned adjacent area decreases progressively from the transition section towards the free end of the second section. In the other areas of the cover, the fiberglass layer is thinner, which makes it possible to reduce the total weight of the cover, which is especially important in aircraft.

The fiberglass layer forming the reinforcement of the cover of the present invention may be a stratified layer formed of a plurality of fiberglass cloths being piled-up on top of each other and glued together in a manner conventional per se. In those areas in which the reinforcement must be thicker, more cloths being suitably cut to patterns which determine the size and shape of each one of said cloths, are piled-up.

The reinforcement comprised of the fiberglass layer of the cover of the present invention provides substantial advantages over conventional reinforcements comprised of plastic or metal elements. Thus, first of all, with regard to the process of manufacturing the cover of the present invention, the different thicknesses which are required in the different areas of the cover and which make it possible to leave out thicknesses of reinforcement in those areas which are not subjected to substantial stresses, are readily achieved by varying the thickness of the fiberglass layer, which contrasts with the need of achieving the different thicknesses by means of molding the plastic reinforcement elements and with the need of achieving the different thicknesses of the metal reinforcements for example by means of chemical milling.

In addition thereto, the use of fiberglass as a composite reinforcement material enhances, as compared to conventional reinforcements such as carbon fiber, the galvanic compatibility of materials, thus reducing the possibility of corrosion if mounted on aluminum components, which are attacked by carbon fiber. On the other hand, also, the galvanic incompatibility that conventional metal reinforcement elements have against carbon elements which constitute a part of many components and vehicles and particularly of aircraft is avoided.

Another advantage of the fiberglass being used on the outside of the cover of the present invention is the fact that this outer side can be painted, therefore increasing its resistance to weathering and noticeably improving the aesthetic finish of the cover, thereby being an element which provides continuity to the paint pattern of the vehicle, the requirements of the paint system selected (primer and finishing coat) being a compatibility with fiberglass composite material, suiting to aerodynamic contour (high-solid finish) and a high degree of flexibility in order not to deteriorate with the deflections of the seal.

In the aforesaid area adjacent to the first section, also the main body may conveniently, for the purpose of providing a suitable degree of bending strength, be of a thickness which increases progressively along the transition section and which decreases in the direction towards the free end of the second section.

In one embodiment of the cover of the present invention, the transition section extends along a slanted longitudinal axis which connects said first axial plane with said second axial plane. The slant of the outer surface of the transition section is not necessarily the same as that of the inner surface of said section. Thus, the slant of the outer surface may be the same as that of a beveled edge of the outer surface of the fixed part of the vehicle, whilst the interior surface may be slanted to a greater degree for the purpose of increasing the thickened area of the main body.

In accordance with an embodiment of the invention, the first area may be provided with respective protruding edges which each respectively extend from the sides towards the center of the first area. These protruding edges may be padded ribs, and contact the outer surface of the moving part of the vehicle, and are spaced apart from each other by a distance substantially equal to the transversal extension of the base of the second area. The protruding edges may have a convexly curved cross-section.

In a preferred embodiment of the invention, the cover comprises a main silicone rubber body and has a first tongue-shaped section and a second section in the form of an integrated tab for attaching it to an adjacent structural element. The main body is reinforced on its outer (aerodynamic) side with a fiberglass layer with a high-level surface finish and covered on its inner side (contact with moving part) in a low-friction polyester fabric.

The second section has two areas, following the adjacent section in direction towards the free end thereof, namely, a first area with a tongue of a length compatible with other sealing solutions within the aerodynamic contour, with the option of including a rounded protruding bottom edge for contact with the moving part, and a second area, narrower than the first area, extended beyond the aerodynamic contour of sufficient size to cover the cut-out between the fixed surface and the moving surface, which may lack such an projecting edge so as to minimize projections beyond the aerodynamic contour. Integrating these two areas in the same cover provides a smooth transition between the same, thus making it possible to improve the aerodynamic precision.

According to an embodiment of the cover of the present invention especially useful on aircraft and, particularly for covering the openings on the elevators of the type described hereinabove, the first section which forms the attachment tab is stage-shaped for bolting it to a structural element such as a metal or carbon fiber panel, with a bevel on its inner surface for positioning the stage. The rigidity of this tab, achieved with greater thicknesses of the fiberglass layer, allows it to be mechanized in the vicinity of the turning fittings, so that interferences are avoided and integration thereof into the structure is possible. Likewise it affords the possibility of attachment elements to be mounted thereat, such as rivetable nuts, as a result of which no additional metal section is needed for reinforcing the attachment, as would usually be used for preventing rips in the cloth-reinforced seals. This alternative is suitable in cases in which it is desired to uninstall the seal without the need of accessing the interior of the structure, as the seal itself retains the nut without any need of using a spanner, which could be necessary for making inspections of the assembly of fittings supporting the moving aerodynamic surface. The tab can also take a catch made directly by a bolt, nut and washer.

BRIEF DESCRIPTION OF THE DRAWINGS

In the following, a description is provided of some practical embodiments of the elements on the basis of some figures in which.

Figure 1:
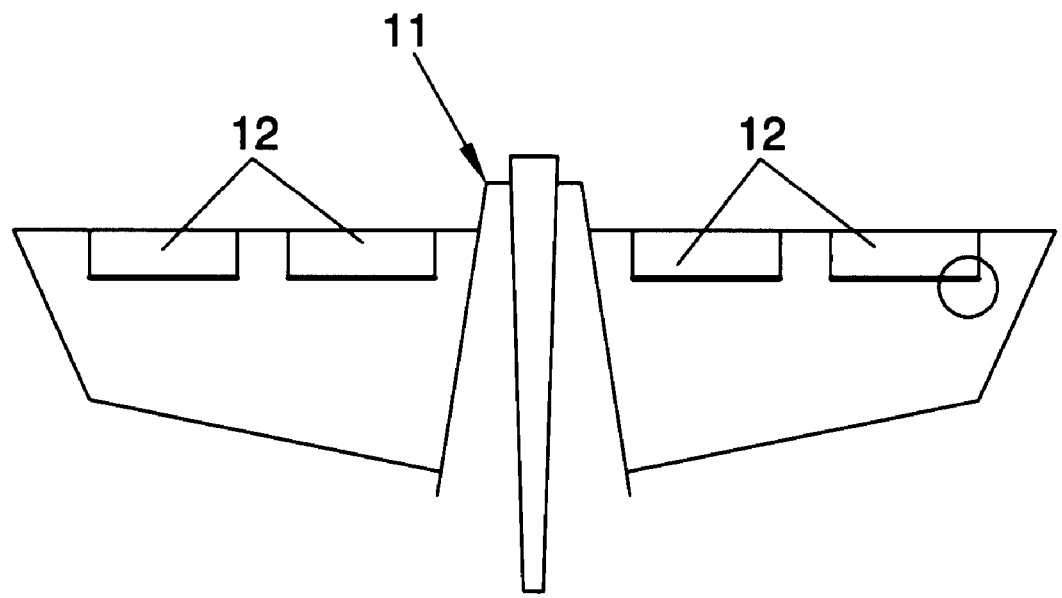
FIG. 1 is a schematic top plan view of the backward section of an aircraft.

These figures include references identifying the following elements:

1 cover
1a first attachment section
1b outer surface of the first section
1c second section
1d free end of the second section
1e inner surface of the second section
1f adjacent area of the second section to the first section
1g transition section
1h inner protruding edge
1i first area of the second section
1j second area of the second section
1k outer surface of the second section
2 structural element of the vehicle
3 hollow
4 cut-out
5 fixed part
5a outer surface of the fixed part of the vehicle
6 moving part of the vehicle
6a outer surface of the moving part
7 reinforcement means
7a fiberglass layer
8 low-friction layer
9 main interior body of elastic material
10 means of attaching the first section to the structural element
11 vehicle (aircraft)
12 elevator
12a curved section of the elevator
13 fitting on the fixed structure
14 fittings on the moving structure
15 bolt
16 throughhole in the attachment section
I first axial plane
II second axial plane
III longitudinal axis

MODE TO CARRY OUT THE INVENTION

Figure 2:
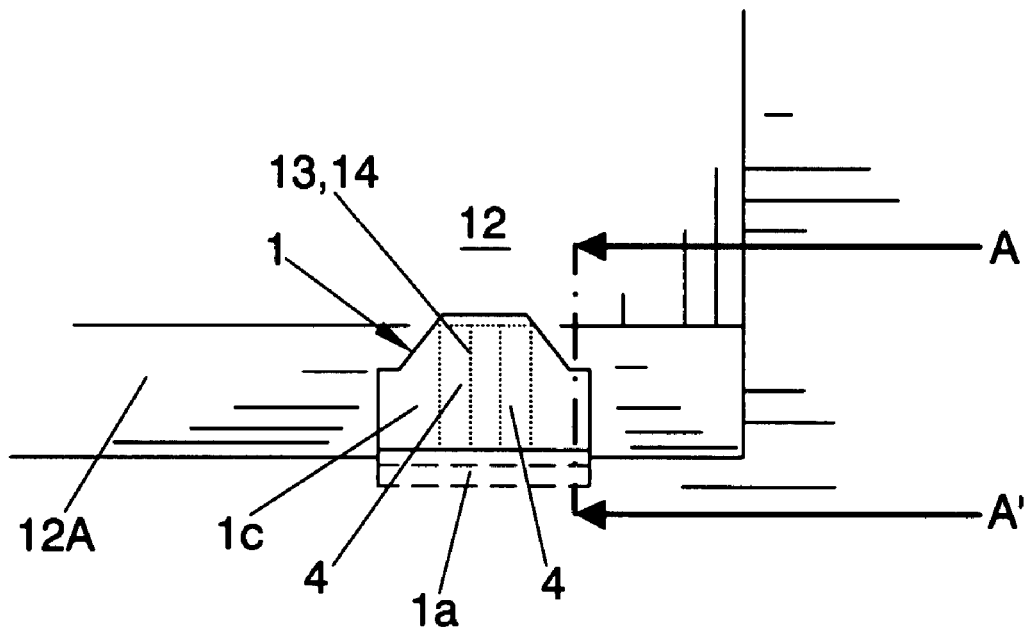
FIG. 2 is a schematic top plan view of the area marked with a circle on FIG. 1, corresponding to the area in which a elevator catch is located.
Figure 5:
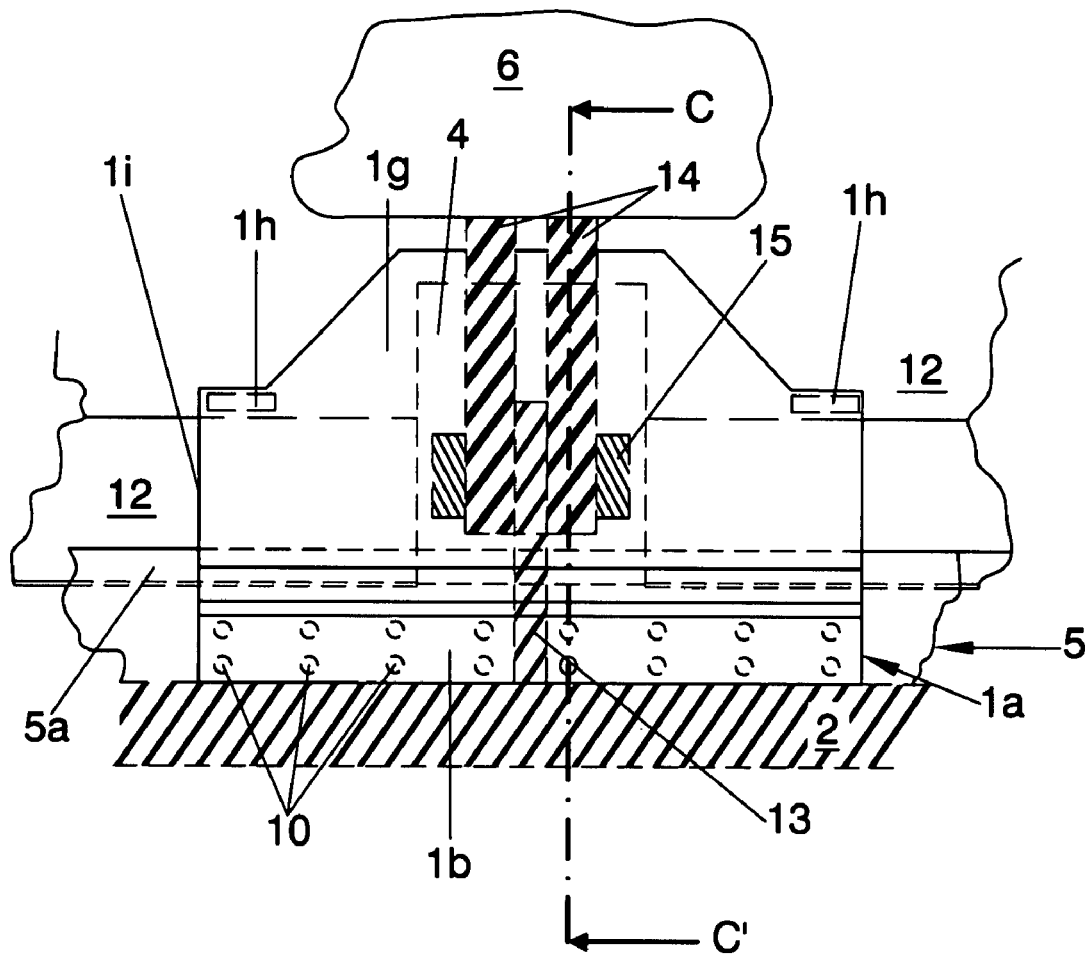
FIG. 5 is a schematic view providing greater detail of the position of the cover in FIGS. 2 and 4 at the catch of an aircraft elevator.

FIG. 1 shows the tail section of an aircraft where elevators 12 are located, being articulated to the fixed structure of the aircraft by means per se conventional catches. As is shown in FIGS. 2 and 5, these catches are fittings 13, 14 coupled to each other by means of a bolt 15, respectively joined to the fixed structure of the stabilizers of the aircraft and to the moving structure of the elevators 12. In order to allow the tilting of the elevator 12 with respect to the fixed part of the aircraft stabilizer, a cut-out 4 is conventionally located on the curved part 12a of the elevator 12. This cut-out 4 is aerodynamically a drawback given that a flow of air may blow into the hollow inside the stabilizer through this cut-out, causing turbulences resulting in greater drag. Likewise, the flow of air entering inside the stabilizer through the cut-out 4 may carry water and foreign objects along with it, which may cause wearing-out and even damage to the elements located inside the stabilizer. This problem obviously becomes greater the larger the number of catches and therefore the greater the number of cut-outs 4 existing in the elevator. The reinforced cover of the present invention can be used for covering these cut-outs 4.

Thus, as is shown in FIGS. 2 to 6, the cover 1 of the present invention is mounted for covering the cut-out 4 located in the curved anterior part 12a of the elevator 12, so as to prevent an air current from flowing into the hollow 3 between the fixed structure 2 of the stabilizer and the moving structure of the elevator 12 through the cut-out 4, such that no air current will flow inside towards the interior of the stabilizer.

Figure 3:
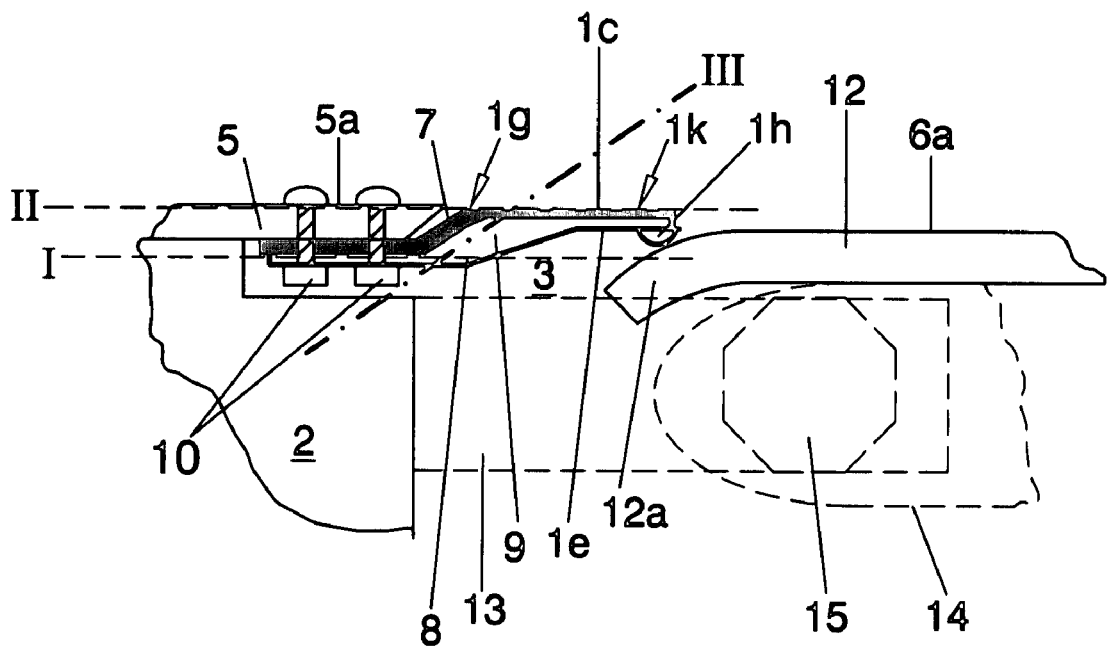
FIG. 3 is a schematic cross-section view along the A-A' line shown in FIG. 2.

Cover 1 comprises a first attachment section 1a shaped in the form of an attachment tab, and a second section 1c which covers the hollow 3 by resting on the surface 6a of the elevator 12. As is shown in FIG. 3, the cover 1 is joined to the fixed structure of the stabilizer by catching elements including bolt/washer/nut assemblies 10, which pass through transversal holes 16 through both the attachment tab 1a and the fixed part 5 which is constituted by a portion of an exterior panel which is joined, in turn, to a structural element 2 of the stabilizer.

Between the attachment tab 1a and the second section 1c of the cover there is a transition section 1g which allows the tab 1a and the second section 1c to be respectively located on axial planes I and II. The first axial plane I is located at the level of the inner surface of the external panel 5, whilst the second axial plane II is located at the level of the outer surface 5a of the external panel 5. In turn, the transition section 1g extends along a slanted longitudinal axis, which extends from said first axial plane I up to said second axial plane II.

By means of this configuration, it is thus possible for the outer surface 1k of the second section 1c to flush with the surface 5a of the panel 5, and for the attachment tab 1a to be anchored to the inside of the panel 5.

Figure 4:
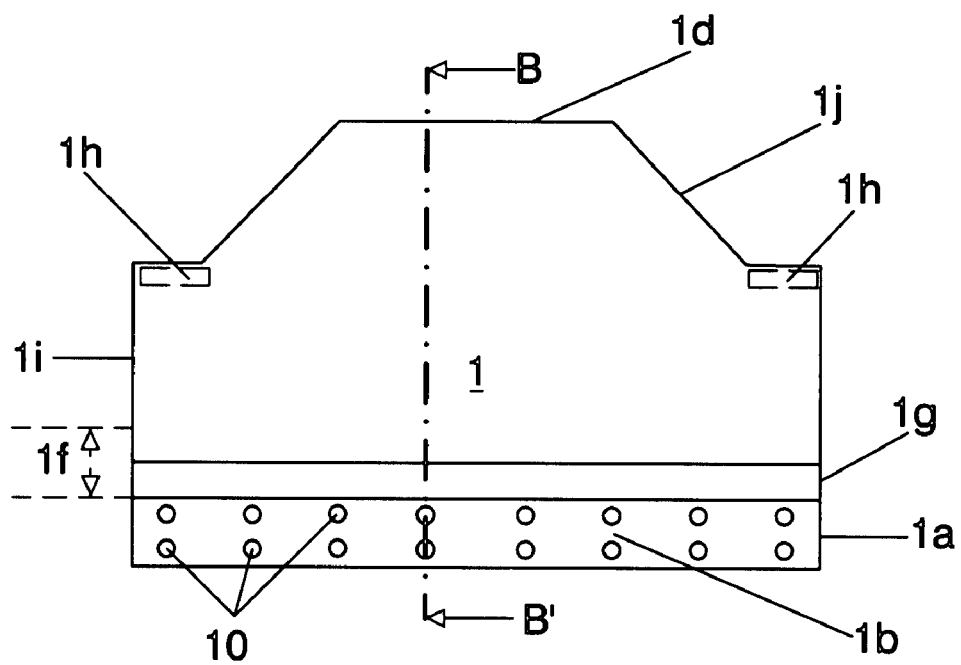
FIG. 4 is a schematic top plan view of an embodiment of the cover of the present invention.

As is particularly shown in FIG. 4, the second section 1c has a first area 1i in a rectangular-shaped configuration which extends from the adjacent area 1f of a first cross-section, and a second area 1j with a smaller cross-section than the cross-section of the first area 1i, which extends up to the free end 1d. This second area 1j is trapezoidal and has a base of a lesser transversal extension than the cross-section of the first area 1i. The first area 1i has both padded protruding edges 1h on its inner surface which are of a curved convex cross-section, extending respectively from the sides up to the center of the first area 1i. These edges 1h contact, as is shown in FIG. 3, the outer surface 6a of the curved section 12a of the elevator 12 and are spaced apart from each other at a distance substantially equal to the transversal extension of the base of the second area 1j.

Figure 6:
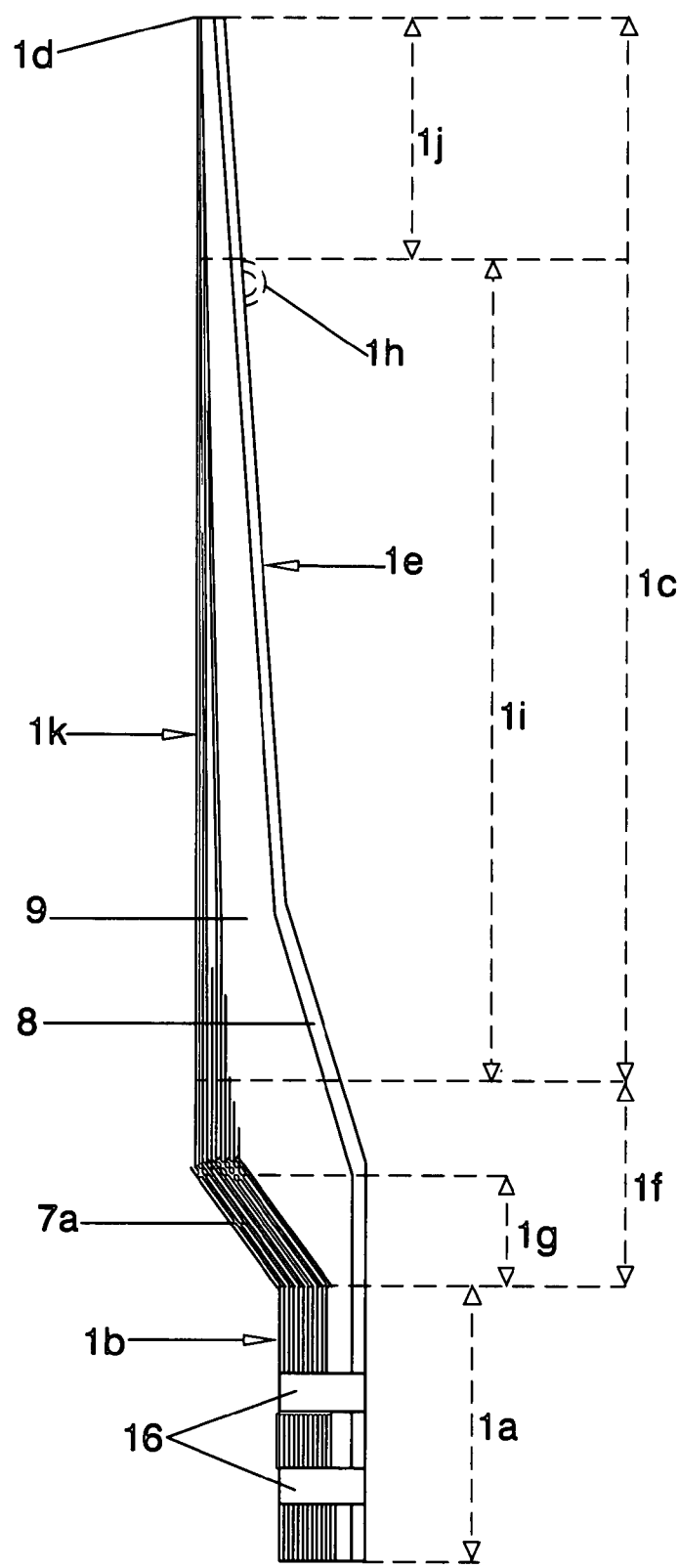
FIG. 6 is a schematic side view along line B-B' shown in FIG. 4.

FIGS. 3 and 6 illustrate that the cover includes a main body 9 made of silicone rubber, coated on its outer surface with a reinforcement 7, and on its inner surface with a low-friction layer 8 of polyester fabric. The reinforcement 7 is a fiberglass layer 7a, variable in thickness in terms of the stresses to which the first and the second sections 1a, 1c are exposed. These stresses are greater at the first section 1a corresponding to the attachment tab as a result of the anchoring points of the attachment means 10 being located there and at the transition section 1g given that this is where bending stress is caused in view of the fact that the bending axis between the immobilized section which comprises the attachment tab 1a and the free end 1d of the second section 1c is located in the transition section 1g. Therefore, the thickness of the fiberglass layer 7a at said first section 1a and at said adjacent area 1f of the second section 1c is greater than the thickness at other sections of the cover, and progressively decreases from the transition section 1g towards the free end 1d of the second section 1c. In turn, in the adjacent area 1f, the main body 9 is of a thickness which progressively increases along the transition section 1g and decreases in the direction towards the free end 1d of said second section 1c.

The embodiment illustrated in FIG. 6 shows how the layer made of fiberglass 7a which forms the reinforcement is a stratified layer made of a plurality of piled-up fiberglass cloths that are glued to each other in a per se conventional manner. In those areas in which the reinforcement must be thicker, specifically at the attachment section 1a, the adjacent area 1f and at the transition section 1g, the number of piled-up cloths is greater than in other sections of the reinforcement. Each one of these cloths has been suitably cut to a pattern determining their size and shape in order for it to be possible for them to be piled-up in the proper area.

Figure 7:
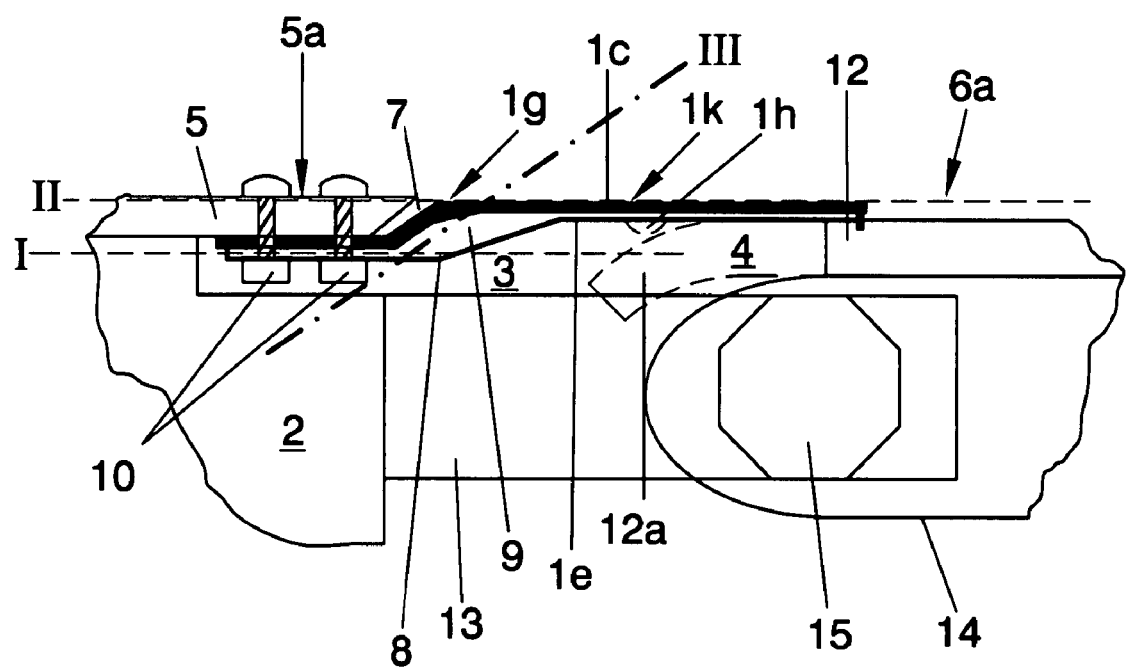
FIG. 7 is a partial schematic cross-sectional view along line C-C' of the cover corresponding to FIG. 6 which shows how the cover is arranged on the surface of the elevator in an inactive position.
Figure 8:
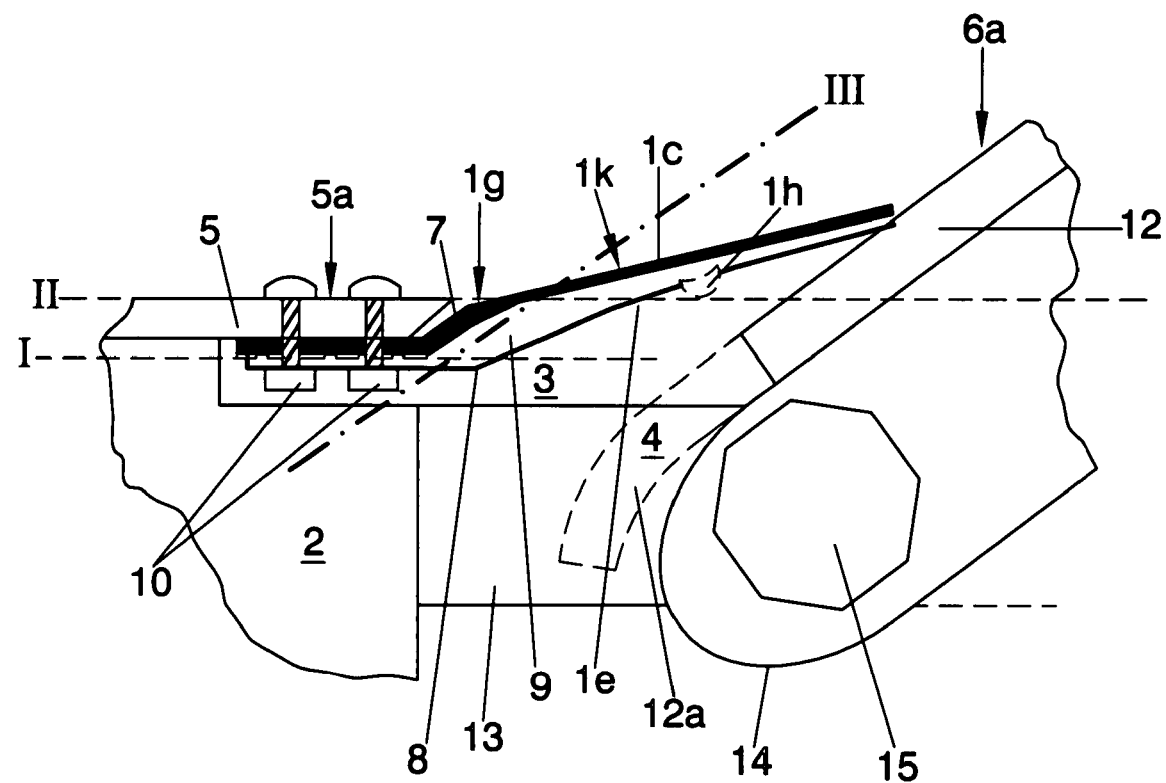
FIGS. 8 and 9 are schematic side views showing how the cover shown in FIG. 6 adapts to two different positions of the elevator.
Figure 9:
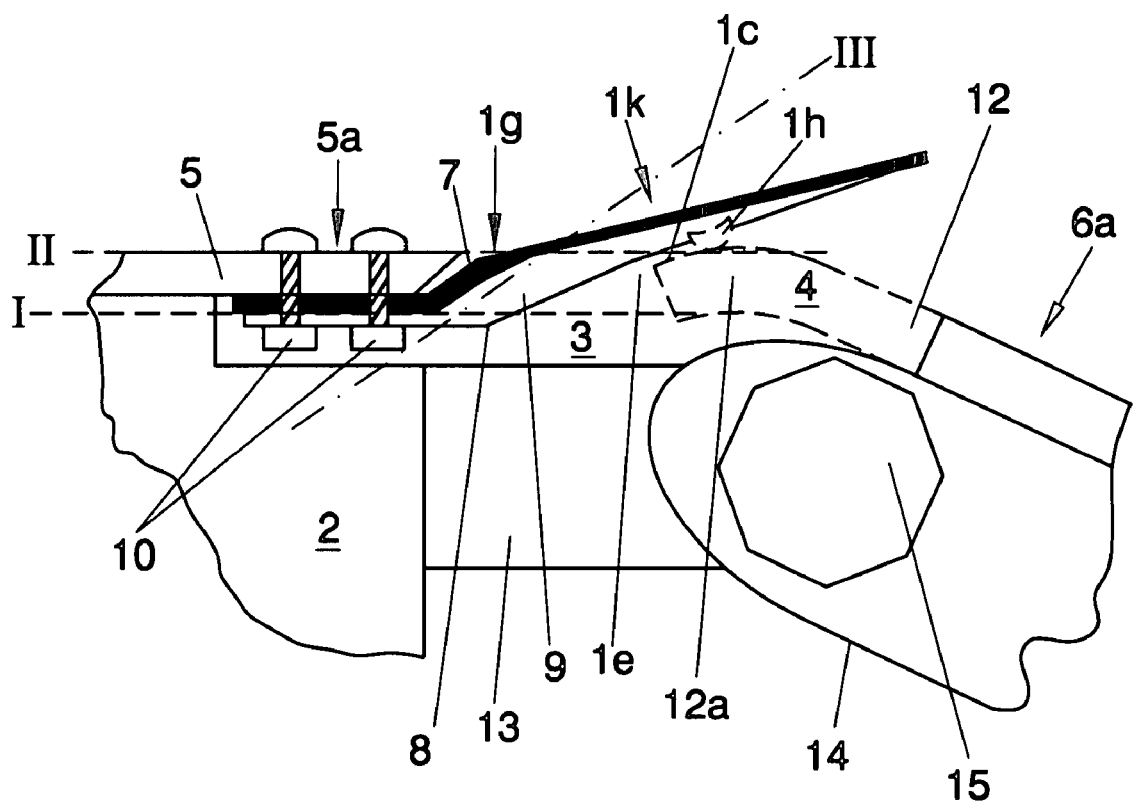

FIGS. 7 to 9 illustrate the manner in which the cover adapts to the tilting of the elevator 12. Thus, FIG. 7 shows the cover when the elevator 12 is in horizontal position. In this position, the second section 1c rests on the padded edges which are shown in FIGS. 3 to 5.

In an ascent maneuver, the elevator 12 progressively pushes the free end 1d of the second section 1c of the cover upward until the second section 1c adopts the position shown in FIG. 8. Apart therefrom, in a an aircraft descent maneuver, it is the front curved section 12a of the elevator which, on its surface 6a coming into contact with the padded edges 1h, progressively moves the free end 1d of the second section 1c upward until the second section 1c of the cover adopts the position shown in FIG. 9.

It is shown how, in any of the positions, the cover perfectly covers the cut-out 4 and, therefore deflects the air currents such that they cannot flow through said cut-out 4 into the hollow inside of the stabilizer. Apart from this, it is shown how the greater thicknesses of the main body 9 and of the reinforcement 7 at the transition section 1g enables the cover to suitably bend whilst the reinforcement 7 prevents the flapping of the second section 1c.

For the use for sealing cut-out 4 in aircraft elevators 12, suitable fiberglass cloths for obtaining the fiberglass layer are, for example, continuous filament fiberglass cloths, impregnated with epoxy resin, in accordance with the following specifications which are quoted herein as an example in the following Table:

TABLE 1

| Characteristic | Specifications |
| --- | --- |
| Fiberglass | 100% |
| epoxy resin | E644 |
| Density | 1.4 |
| impregnation rate | 43% |
| Finished cloth size (cm) | 100 |
| Weight (g/m2) | 290-320 |
| Thickness (mm) | 0.2-0.3 |
| Tensile strength (Mpa) | >30 |
| Bending strength (Mpa) | 50-55 |

On the other hand, the low-friction layer may be made of polyester fabrics which, as an example, may be of specifications such as those specified in the following Table:

TABLE 2

| Characteristic | Specifications |
| --- | --- |
| Type of polyester | LFT with silicone coating |
| Type of weave | Warp fabric |
| Type of filament | Continuous 55/56 decitex |
| Weave | 18 threads chain 19 threads weft |
| Weight (g/m2) | 200-500 |
| Thickness (mm) | 0.3-0.5 |
| Tensile strength (daN/5 cm) | >45 |
| Ultimate elongation | >65 |
| Breaking strength (bar) | >10 |

Apart from the above, the interior body may be made out of silicone rubber of the characteristics such as those which are specified for purpose of example in the following Table:

TABLE 3

| Characteristic | Specifications |
| --- | --- |
| Hardness (DIDC) | 46-55 |
| Tensile strength | >4 |
| Ultimate elongation (%) | approx. 200 |
| Wind shear strength | approx. 9 |
| Density | approx. 1, 2 |

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. Reinforced cover for cut-outs in an aerodynamic contour of a vehicle, particularly for an aircraft, comprising
a first section for securing the cover to an external panel of a structural element of the vehicle by attachment means, the external panel having an inner surface and an outer surface,
a flexible second section being tongue-shaped and having an extension that at least partially covers a cut-out between the external panel and a moving part of the vehicle and with a free end which ends on said moving part, the second section having an inner surface and an outer surface,
reinforcement means, and
a low-friction layer which at least partially covers the inner surface of said second section, the first section being secured on the inner surface of the external panel and the outer surface of the second section flushing with the outer surface of the external panel as a continuation of said outer surface of the external panel;

the reinforcement means comprising a reinforcement member with at least one fiberglass layer in epoxy resin having a thickness and formed at the outer surface of the first section and at least in one adjacent area to said first section of the outer surface of said second section;

said reinforcement member in the first section having an under surface and extending substantially in a first axial plane and in the said second section extending substantially in a second axial plane, said first axial plane being different from said second axial plane;

an elastic member connected on the under surface of the reinforcement member on at least the adjacent area of the second section; and the second section comprises a first area plan view which extends from said adjacent area with a first cross-section, and a second area plan view with a second cross-section smaller than the cross-section of the first area and which extends towards said free end.

2. Reinforced cover according to claim 1, wherein the fiberglass layer comprises a plurality of piled-up fiberglass cloths that are glued to each other, the thickness of the fiberglass layer being determined by the number of piled-up fiberglass cloths.

3. Reinforced cover according to claim 2, wherein the fiberglass layer comprises a larger number of piled-up fiberglass cloths in areas of said first and said second section which are exposed to greater stresses than in areas subjected to lesser stresses.

4. Reinforced cover according to claim 2, wherein the fiberglass layer comprises a larger number of piled-up fiberglass cloths in said first section and in said adjacent area of the second section that in other sections of the cover.

5. Reinforced cover according to claim 2, wherein the number of piled-up fiberglass cloths in the second section decreases towards the free end of said second section.

6. Reinforced cover according to claim 2, wherein the number of piled-up fiberglass cloths in said adjacent area decreases progressively towards the free end of the second section.

7. Reinforced cover according to claim 1, wherein the thickness of the fiberglass layer is greater in areas of said first and said second section which are exposed to greater stresses, than in areas subjected to lesser stresses.

8. Reinforced cover according to claim 1, wherein the thickness of the fiberglass layer in said first section and in said adjacent area of the second section is greater than the thickness of the fiberglass layer in other sections of the cover.

9. Reinforced cover according to claim 1, wherein the thickness of the fiberglass layer in the second section decreases in the direction towards the free end of said second section.

10. Reinforced cover according to claim 1, wherein the thickness of the fiberglass layer on said adjacent area decreases progressively towards the free end of the second section.

11. Reinforced cover according to claim 1, wherein a transition section extends along a slanted longitudinal axis which extends from said first axial plane to said second axial plane.

12. Reinforced cover according to claim 11, wherein in said adjacent area, the elastic member is of a thickness which progressively increases in said transition section and decreases towards the free end of said second section.

13. Reinforced cover according to claim 1, wherein said second area is trapezoidal.

14. Reinforced cover according to claim 13, wherein said trapezoidal second area has a base having a cross-section that is smaller than the cross-section of the first area.

15. Reinforced cover according to claim 14, wherein the first area has two protruding edges which respectively extend from the sides towards the center of the first area, and which contact the outer surface of said moving part of the vehicle, said protruding edges being spaced apart from each other by a distance substantially equal to the transversal extension of the base of said second area.

16. Reinforced cover according to claim 15, wherein each protruding edge has a convexly curved cross-section.

17. Reinforced cover according to claim 1, wherein the free end of the second section has at least partially a bottom protruding edge which contacts the outer surface of said moving part of the vehicle.

18. Reinforced cover according to claim 1, wherein the material of the elastic member is silicone rubber.

19. Reinforced cover according to claim 1, wherein the low-friction layer is made of polyester fabric.

20. Reinforced cove according to claim 1, wherein said first section is in the shape of an attachment tab.

21. Reinforced cover according to claim 1, wherein at least the outer surface of said second section is coated with paint.

22. Reinforced cover according to claim 1, wherein the outer surface of the cover is coated with paint.

23. Reinforced cover according to claim 1, wherein the first attachment section comprises at least one transversal hole for receiving the attachment means.

24. Reinforced cover according to claim 23, wherein the attachment means are selected from rivets, nut-bolt assemblies and bolt-rivetable nut assemblies.

* * * * *